(12) United States Patent
Lo et al.

(10) Patent No.: US 11,029,556 B2
(45) Date of Patent: Jun. 8, 2021

(54) DISPLAY DEVICE

(71) Applicant: Coretronic Corporation, Hsin-Chu (TW)

(72) Inventors: Yi-Chien Lo, Hsin-Chu (TW); Hung-Ta Chien, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/407,114

(22) Filed: May 8, 2019

(65) Prior Publication Data
US 2019/0353954 A1 Nov. 21, 2019

(30) Foreign Application Priority Data
May 17, 2018 (CN) .......................... 201810494251.8

(51) Int. Cl.
*G02F 1/1335* (2006.01)
*G02B 27/28* (2006.01)
(52) U.S. Cl.
CPC ..... *G02F 1/133528* (2013.01); *G02B 27/283* (2013.01); *G02F 1/13355* (2021.01)
(58) Field of Classification Search
CPC ........... G02F 1/133528; G02F 1/13355; G02B 27/283
USPC ........................................ 349/5–11, 13–14
See application file for complete search history.

(56) References Cited

U.S. PATENT DOCUMENTS

| 6,243,065 | B1 * | 6/2001 | Robrish | .............. | G02F 1/13362 345/97 |
| 6,281,994 | B1 * | 8/2001 | Horikoshi | ............ | G03H 1/0248 359/12 |
| 6,417,895 | B1 | 7/2002 | Tabata et al. | | |
| 7,106,389 | B2 | 9/2006 | Katoh et al. | | |
| 2003/0133060 | A1 | 7/2003 | Shimada | | |

(Continued)

FOREIGN PATENT DOCUMENTS

| TW | 201331696 | 8/2013 |
| WO | 9934246 | 7/1999 |
| WO | 2018011285 | 1/2018 |

OTHER PUBLICATIONS

"Office Action of Europe Counterpart Application," dated Jul. 22, 2019, p. 1-p. 11.

(Continued)

*Primary Examiner* — Charles S Chang
(74) *Attorney, Agent, or Firm* — JCIPRNET

(57) ABSTRACT

A display device comprising a beam splitting element, a polarization modulating element, a light shifting element and a reflective liquid crystal panel is provided. The polarization modulating element is disposed on one side of the beam splitting element along the first direction between the beam splitting element and the light shifting element, the light shifting element is disposed on one side of the polarization modulating element along the first direction between the polarization modulating element and the reflective liquid crystal panel, and the reflective liquid crystal panel is disposed on one side of the light shifting element along the first direction, wherein the beam splitting element receives an illumination beam and allows an image beam to pass through, the illumination beam is reflected in the beam splitting element and transmitted in the first direction.

9 Claims, 4 Drawing Sheets

(56) References Cited

U.S. PATENT DOCUMENTS

| 2005/0185139 | A1* | 8/2005 | Yamanaka | G02B 27/283 |
| | | | | 353/20 |
| 2013/0016292 | A1 | 1/2013 | Miao et al. | |
| 2014/0333902 | A1* | 11/2014 | Aboshi | G02B 27/1033 |
| | | | | 353/38 |
| 2014/0347736 | A1 | 11/2014 | Liu et al. | |
| 2018/0039065 | A1* | 2/2018 | Iwai | G02B 27/0176 |

OTHER PUBLICATIONS

"Office Action of China Counterpart Application", dated Feb. 3, 2021, p. 1-p. 8.

* cited by examiner

DISPLAY DEVICE

CROSS-REFERENCE TO RELATED APPLICATION

This application claims the priority benefit of China application serial no. 201810494251.8, filed on May 17, 2018. The entirety of the above-mentioned patent application is hereby incorporated by reference herein and made a part of this specification.

BACKGROUND

Technical Field

The invention relates to a display technique, and more particularly, to a display device with high resolution.

Description of Related Art

In general, image resolution of a display is limited by panel size and pixel size. The display may be, for example, NED (Near-eye display) display, VR (Virtual Reality) display and AR (Augmented Reality) display. With the increasing demand for the use of various displays described above and the increasing number of applications, the demand for image resolution of the displays is also increasingly higher. Because the limitation involving manufacturing yield, manufacturing cost and body size as limited by panel size and pixel size is not easily solved, the image resolution of the displays described above may not be effectively improved. In particular, under the display mechanism of a light field display, when the light field display intends to generate images with a sense of depth, the light field display would sacrifice more resolution in order to generate the images with the sense of depths. However, the lack of image resolution would lead to a screen-door effect, which may be easily observed by human eye. Therefore, under the current situation where the image resolution of the display is insufficient, how to effectively improve the image resolution is one of the most important topics in the field.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides a display device which may effectively improve image resolution to provide favorable display effect.

Other objectives and advantages of the invention may be further understood from the technical features disclosed in the invention.

To achieve one, a part, or all of the above objectives or other objectives, an embodiment of the invention proposes a display device. The display device includes a beam splitting element, a polarization modulating element, a light shifting element and a reflective liquid crystal panel. The beam splitting element receives an illumination beam and allows an image beam to pass through. The illumination beam is reflected in the beam splitting element and transmitted in a first direction. The polarization modulating element is disposed on one side of the beam splitting element along the first direction. The polarization modulating element is configured to modulate or maintain polarization states of the illumination beam and polarization states of the image beam. The light shifting element is disposed on one side of the polarization modulating element along the first direction. The light shifting element is configured to modulate the image beam having a polarization state to be shifted by a distance. The polarization modulating element is disposed between the beam splitting element and the light shifting element. The reflective liquid crystal panel is disposed on one side of the light shifting element along the first direction. The reflective liquid crystal panel is configured to receive the illumination beam and emit the image beam in a second direction. The first direction is opposite to the second direction. The light shifting element is disposed between the polarization modulating element and the reflective liquid crystal panel.

Based on the above, the embodiments of the invention have at least one of the following advantages and effects. According to the display device of the invention, two illumination beams having the polarization states perpendicular to each other may be generated by the beam splitting element and the polarization modulating element, and then reflected by the reflective liquid crystal panel to generate two image beams having the polarization states perpendicular to each other. Among them, the image beam having the second polarization state is shifted after passing through the light shifting element. Lastly, the display device of the invention may rotate the image beam having the first polarization state through the polarization modulating element so the two image beams may have the same second polarization state and may be projected onto the projection target through the beam splitting element. Accordingly, the projection target may sequentially receive the two image frames, and each pixel in one of the two image frames would overlap with the respective pixel in another one of the two image frames. In other words, the overlapping image frames may provide higher resolution than one single image frame. As a result, the display device of the invention may effectively improve image resolution of the reflective liquid crystal panel to provide favorable display effect.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
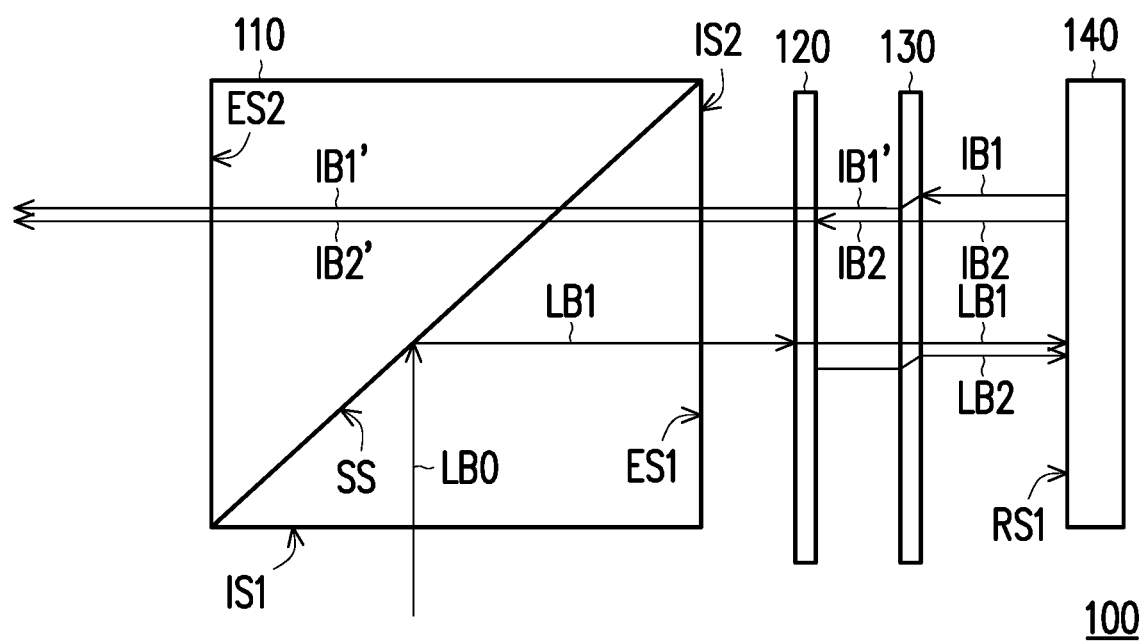
FIG. 1 is a schematic view of a display device according to an embodiment of the invention.

FIG. 1 is a schematic view of a display device according to an embodiment of the invention. With reference to FIG. 1, a display device 100 includes a beam splitting element 110, a polarization modulating element 120, a light shifting element 130, and a reflective liquid crystal panel 140. In this embodiment, the beam splitting element 110, the polarization modulating element 120, the light shifting element 130, and the reflective liquid crystal panel 140 are sequentially arranged and spaced apart from each other along a first direction P1. A first incident surface IS1 of the beam splitting element 110 receives an illumination beam LB0. A beam splitting surface SS of the beam splitting element 110 receives the illumination beam LB0, and an illumination beam LB1 is then reflected by the beam splitting surface SS to a first exit surface ES1. The polarization modulating element 120 is disposed on one side of the beam splitting element 110 along the first direction P1, and the light shifting element 130 is disposed on one side of the polarization modulating element 120 along the first direction P1. Specifically, on a transmission path of the illumination beam LB1, the polarization modulating element 120 is disposed between the beam splitting element 110 and the light shifting element 130, and the light shifting element 130 is disposed between the polarization modulating element 120 and the reflective liquid crystal panel 140.

In this embodiment, the first direction P1 is opposite to a second direction P2. A third direction P3 and a fourth direction P4 are perpendicular to the first direction P1 and the second direction P2. The third direction P3 is opposite to the fourth direction P4.

In this embodiment, the illumination beam LB1 has a first polarization state. The illumination beam LB1 is emitted outside the beam splitting element in the first direction, and transmitted to the reflective liquid crystal panel 140 through the polarization modulating element 120 and the light shifting element 130. In this embodiment, the polarization modulating element 120 may sequentially operate in two operation states to sequentially change a polarization state of the illumination beam LB1. For instance, when the polarization modulating element 120 operates in a turn on state, the polarization modulating element 120 does not modulate the illumination beam LB1 such that the illumination beam LB1 is maintained in the first polarization state. When the polarization modulating element 120 operates in a turn off state, the polarization modulating element 120 modulates the illumination beam LB1 to generate an illumination beam LB2 having a second polarization state. The first polarization state is perpendicular to the second polarization state. Accordingly, with the polarization modulating element 120 operating in different timing sequences, a reflective surface RS1 of the reflective liquid crystal panel 140 may receive the illumination beams LB1 and LB2 having the different polarization states.

In this embodiment, the reflective liquid crystal panel 140 is configured to generate image frames. The reflective liquid crystal panel 140 converts the illumination beam LB1 into an image beam IB1 and reflects the image beam IB1 outside in the second direction P2, where the image beam IB1 has the second polarization state. In addition, the reflective liquid crystal panel 140 converts the illumination beam LB2 into an image beam IB2 and reflects the image beam IB2 outside in the second direction P2, where the image beam IB2 has the first polarization state.

In this embodiment, the light shifting element 130 may shift a beam having the second polarization state in a direction perpendicular to the first direction P1. Therefore, since the image beam IB1 has the second polarization state, after the image beam IB1 passes through the light shifting element 130, the light shifting element 130 would emit the shifted image beam IB1'. When the image beam IB2 leaves the reflective liquid crystal panel 140, since the image beam IB2 has the first polarization state, the image beam IB2 directly passes through the light shifting element 130 to reach the polarization modulating element 120. At this point, since the polarization modulating element 120 operates in the turn off state (the same state for generating the image beam IB2), the polarization modulating element 120 would rotate a polarization state of the image beam IB2, which is then changed from the first polarization state to the second polarization state. Therefore, after the image beam IB2 passes through the polarization modulating element 120, the polarization modulating element 120 would emit an image beam IB2' having the second polarization state. The image beams IB1' and IB2' have the same polarization state. Lastly, the image beams IB1' and IB2' are incident to the beam splitting surface SS through a second incident surface IS2 of the beam splitting element 110, and then the image beams IB1' and IB2' pass through the beam splitting surface SS to be emitted outside the beam splitting element 110 through a second incident surface ES2 in the second direction P2. In this way, the image beams IB1' and IB2' emitted outside the beam splitting element 110 may sequentially generate two image frames on a projection target. Also, because the image beam IB1' is shifted by a distance in the direction perpendicular to the first direction P1, each pixel in the image frame generated by the image beam IB1' partially overlaps the respective pixel in the image frame generated by the image beam IB2'. In other words, the overlapping image frames may provide higher image resolution than one single image frame to thereby solve the screen-door effect.

In this embodiment, the beam splitting element 110 is, for example, a beam splitter (BS), a split prism or a polarized beam splitter (PBS). The beam splitting element 110 may also be a glass plate coated with a beam splitting material or a polarizing material, but not limited thereto. In this embodiment, the polarization modulating element 120 is, for example, a polarization modulator or an adjustable liquid crystal cell, where the polarization modulating element 120 may include a twisted nematic (TN) liquid crystal. The polarization modulating element 120 may, for example, sequentially operate in the turn on state and the turn off state, so as to sequentially change the polarization state of the beam passing through the polarization modulating element 120. In this embodiment, the light shifting element 130 may be a photorefractive crystal, a liquid crystal or a quartz having a fixed polarization direction. The light shifting element 130 may shift a beam having a specific polarization state and passing through the light shifting element 130 in a direction perpendicular the transmission direction of the beam. In this embodiment, the reflective liquid crystal panel 140 may be a LCOS (Liquid Crystal on Silicon) panel. The reflective liquid crystal panel 140 is configured to generate display frames. Also, when the illumination beams LB1 and LB2 are incident to the reflective liquid crystal panel 140, the reflective liquid crystal panel 140 may convert the illumination beams LB1 and IB2 into the image beams IB1 and IB2.

Figure 2:
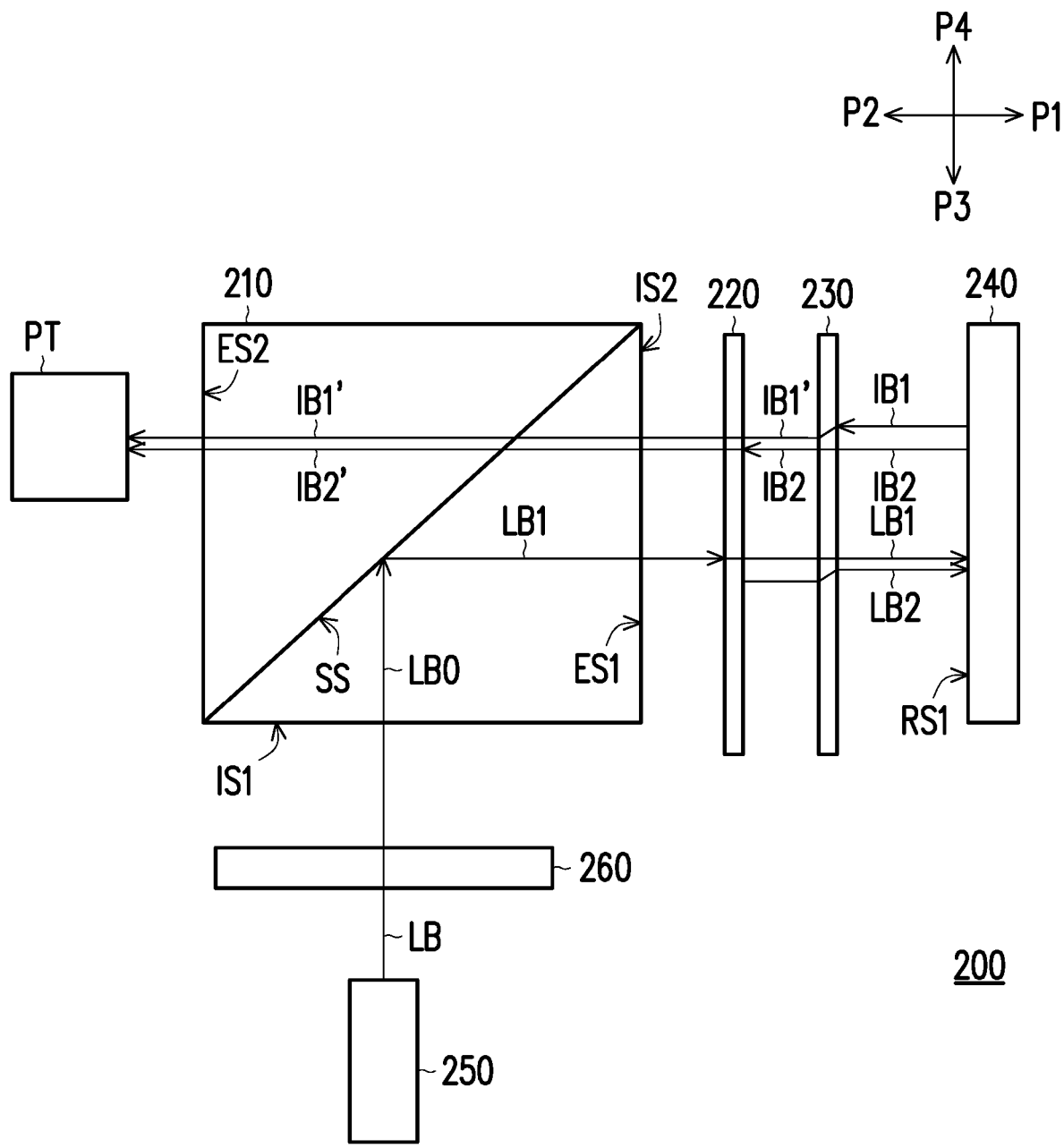
FIG. 2 is a schematic view of a display device according to another embodiment of the invention.

FIG. 2 is a schematic view of a display device according to an embodiment of the invention. With reference to FIG. 2, a display device 200 of the embodiment is, for example, a display, and a projection target PT may be human eye or an image receiver such as a camera. The display device 200 includes a beam splitting element 210, a polarization modulating element 220, a light shifting element 230, a reflective liquid crystal panel 240, a light emitting element 250 and a light polarizing element 260. In this embodiment, the light emitting element 250 is disposed on one side of the beam splitting element 210 along a third direction P3, but not limited thereto. Based on actual designs, relative positions of the light emitting element 250 and the beam splitting element 210 may be adjusted. The light emitting element 250 may be a laser light source or a light emitting diode (LED) light source. The illumination system 250 is configured to provide an illumination beam LB. The third direction P3 is perpendicular to a first direction P1. The light polarizing element 260 is disposed between the light emitting element 250 and the beam splitting element 210. In this embodiment, the light polarizing element 260 is configured to filter the illumination beam LB so an illumination beam LB0 emitted from the light polarizing element 260 has one single polarization state. The light polarizing element 260 may be a polarizer.

Specifically, first of all, after the illumination beam LB emitted from the light emitting element 250 passes through the light polarizing element 260, the light polarizing element 260 emits the illumination beam LB0. The illumination beam LB0 is, for example, in a S polarization state. Also, the illumination beam LB0 is incident to the beam splitting element 210 through a first incident surface IS1 of the beam splitting element 210. The beam splitting element 210 may be a polarized beam splitter. A beam splitting surface SS of the beam splitting element 210 may reflect a beam having the S polarization state, and transmit a beam having a P polarization state outside the beam splitting surface SS. Thus, the beam splitting surface SS of the beam splitting element 210 may receive and reflect the illumination beam LB0 having the S polarization state to generate an illumination beam LB1 having the S polarization state. The illumination beam LB1 is transmitted to a first exit surface ES1 through the beam splitting surface SS in the first direction P1.

Next, the illumination beam LB1 is emitted outside the beam splitting element 210 in the first direction P1, and transmitted to the polarization modulating element 220. When the polarization modulating element 220 operates in a turn on state, the polarization modulating element 220 does not modulate the illumination beam LB1. When the polarization modulating element 220 operates in a turn off state, the polarization modulating element 220 modulates the illumination beam LB1 to generate an illumination beam LB2. The illumination beam LB2 is in the P polarization state. Therefore, after the illumination beams LB1 and LB2 pass through the light shifting element 230, the reflective liquid crystal panel 240 may receive the illumination beams LB1 and LB2 having different polarization states.

Subsequently, the reflective liquid crystal panel 240 converts the illumination beam LB1 into an image beam I1, and then the reflective liquid crystal panel 240 reflects the image beam IB1 in the second direction P2. The polarization state of the image beam IB1 is perpendicular to the polarization state of the image beam LB1. Also, the reflective liquid crystal panel 240 converts the illumination beam LB2 into an image beam IB2 and reflects the image beam IB2 in the second direction P2, and the polarization state of the image beam IB2 is perpendicular to the polarization state of the illumination beam LB2. In other words, the image beam IB1 is in the P polarization state, and the image beam IB2 is in the S polarization state. It should be noted that, the light shifting element 230 may shift the beam having the P polarization state in a direction perpendicular to the first direction P1. Therefore, after the image beams IB1 and IB2 pass through the light shifting element 230, the image beam IB1 is shifted by a distance in the direction perpendicular to the first direction P1. The shifted image beam IB' and the non-shifted image beam IB2 would continue top be transmitted in the second direction P2.

Lastly, when the image beam IB2 passes through the polarization modulating element 220, since the polarization modulating element 220 operates in the turn off state (the same state for generating the image beam IB2), the polarization modulating element 220 would change the polarization state of the image beam IB2. In other words, after the image beam IB2 having the S polarization state passes through the polarization modulating element 220, the polarization modulating element 220 would generate the image beam IB2' having the P polarization state. The image beams IB1' and IB2' having the P polarization state would continue to be transmitted in the second direction P2. Accordingly, after the image beams IB1' and IB2' are incident to a second incident surface IS2 of the beam splitting element 210, the image beams IB1' and IB2' pass through the beam splitting surface SS of the beam splitting element 210 to be transmitted outside the beam splitting element 210 through a second exit surface ES2 in the second direction P2. In this embodiment, the projection target PT is disposed on transmission paths of the image beams IB1' and IB2'. The projection target PT is disposed on one side of the beam splitting element 210 along the second direction P2, and the beam splitting element 210 is disposed between the polarization modulating element 220 and the projection target PT. The projection target PT directly receives the non-shifted image beam IB2' and the shifted image beam IB1' emitted from the second exit surface ES2 of the beam splitting element 210.

In this way, the image beams IB1' and IB2' may sequentially generate two image frames on the projection target PT. Also, because the image beam IB1' is shifted by a distance, each pixel in the image frame generated by the image beam IB1' may partially overlap the respective pixel in the image frame generated by the image beam IB2'. In other words, because the image frame generated by the overlapping image beams IB1' and IB2' may provide higher image resolution than an original image frame provided by the reflective liquid crystal panel 240, the display of the embodiment may effectively provide the image frame with high image resolution.

Figure 3:
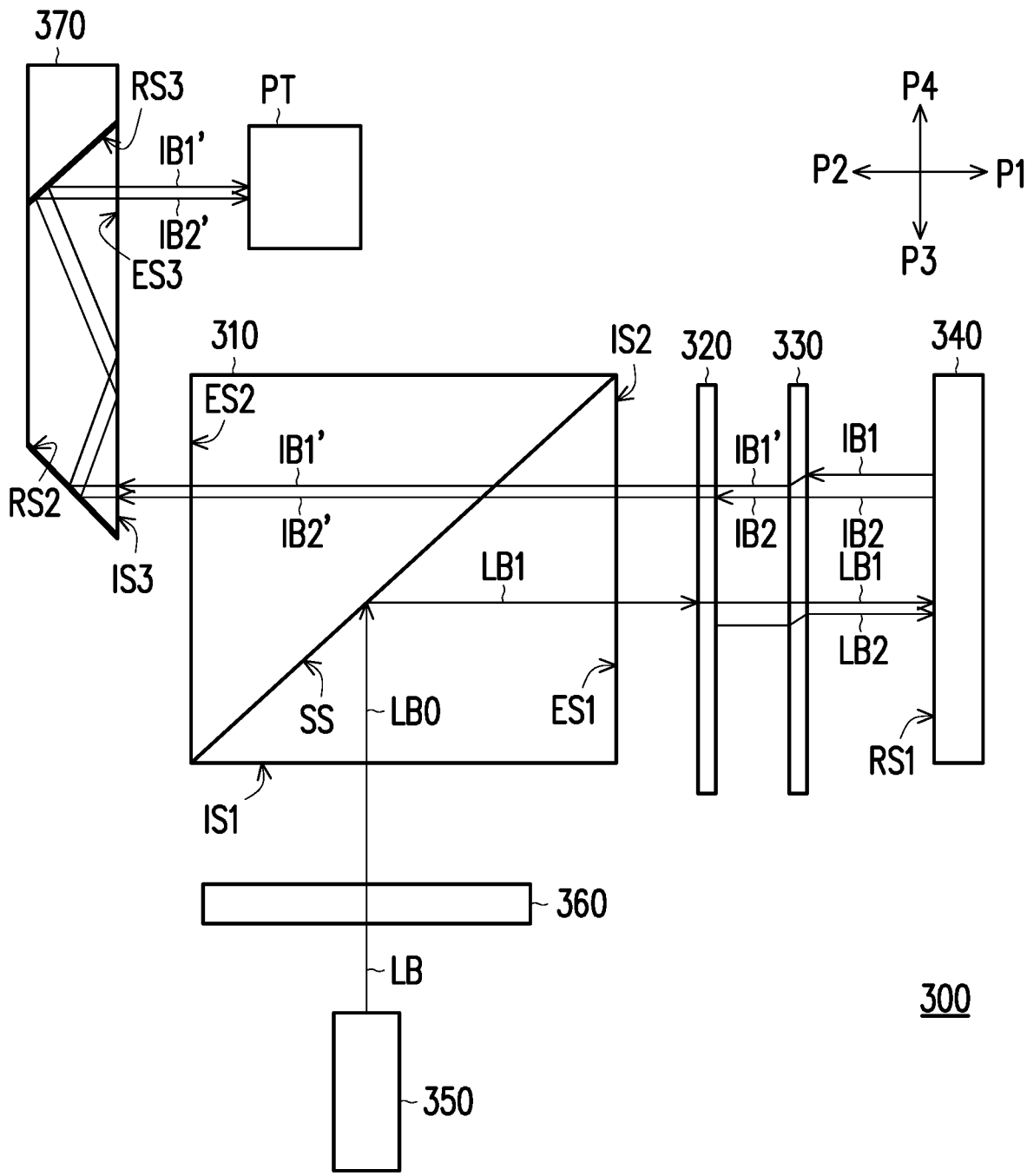
FIG. 3 is a schematic view of a display device according to yet another embodiment of the invention.

FIG. 3 is a schematic view of a display device according to another embodiment of the invention. With reference to FIG. 3, a display device 300 of the embodiment is, for example, a display, and a projection target PT may be human eye. The difference between this embodiment and the embodiment of FIG. 2 is that, at least one optical waveguide device 370 is added. In this embodiment, the display device 300 includes a beam splitting element 310, a polarization modulating element 320, a light shifting element 330, a reflective liquid crystal panel 340, a light emitting element 350, a light polarizing element 360 and the at least one optical waveguide device 370. Here, based on different designs, the number of the at least one optical waveguide device 370 may be adjusted. Accordingly, in the display device 300 of the embodiment, after image beams IB1' and IB2' are incident to a second incident surface IS2 of the beam splitting element 310, the image beams IB1' and IB2' pass through a beam splitting surface SS of the beam splitting element 310 to be transmitted outside the beam splitting element 310 through a second exit surface ES2 in a second direction P2.

In this embodiment, the at least one optical waveguide device 370 is disposed on one side of the beam splitting element 310 along the second direction P2. The projection target PT is disposed on transmission paths of the image beams IB1' and IB2', and receives the image beams IB1' and IB2' transmitted from the at least one optical waveguide device 370. The at least one optical waveguide device 370 is disposed between the beam splitting element 310 and the projection target PT on the transmission paths of the image beams IB1' and IB2'. The at least one optical waveguide device 370 receives the shifted image beam IB1' and the non-shifted image beam IB2' emitted from the beam splitting element 310 through a third incident surface IS3. In this embodiment, after the image beams IB1' and IB2' are reflected by a reflective surface RS2 of the at least one optical waveguide device 370, the image beams IB1' and IB2' would be transmitted in the at least one optical waveguide device 370 (e.g., reflected multiple times). Also, after the image beams IB1' and IB2' are reflected by a reflective surface RS3 of the at least one optical waveguide device 370, the image beams IB1' and IB2' leave the at least one optical waveguide device 370 through a third exit surface ES3 and are projected onto the projection target PT. In this embodiment, the third incident surface IS3 and the third exit surface ES3 of the at least one optical waveguide device 370 are located on the same side of the at least one optical waveguide device 370. In other embodiments, the third incident surface IS3 and the third exit surface ES3 of the at least one optical waveguide device 370 are located on different sides of the at least one optical waveguide device 370.

In this way, the image beams IB1' and IB2' may sequentially generate two image frames on the projection target PT. Also, because the image beam IB1' is shifted by a distance, each pixel in the image frame generated by the image beam IB1' partially overlaps the respective pixel in the image frame generated by the image beam IB2'. In other words, because the image frame generated by the overlapping image beams IB1' and IB2' may provide higher image resolution than an original image frame provided by the reflective liquid crystal panel 340, the display of the embodiment may effectively provide the image frame with high image resolution.

Figure 4:
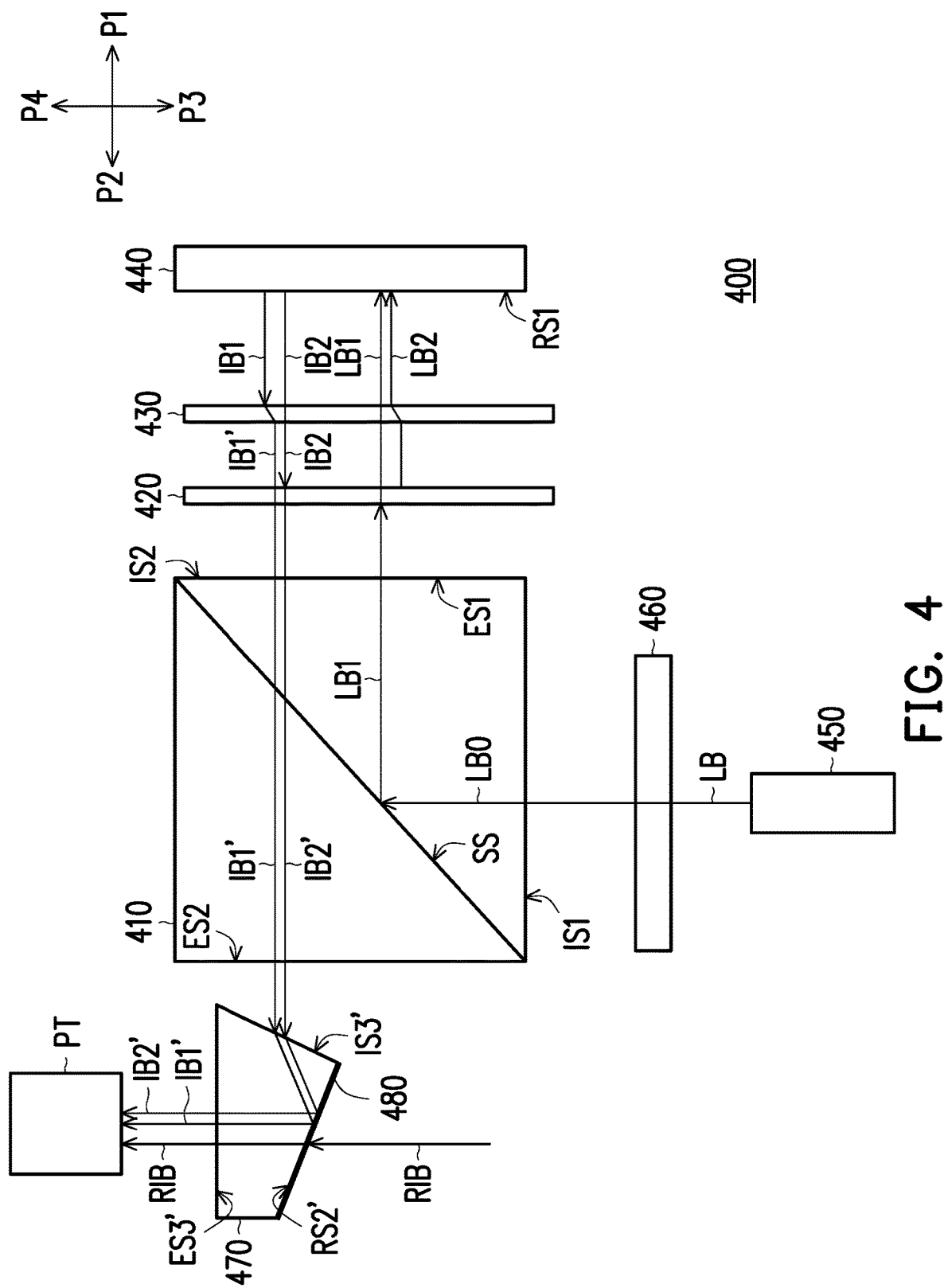
FIG. 4 is a schematic view of a display device according to yet another embodiment of the invention.

FIG. 4 is a schematic view of a display device according to yet another embodiment of the invention. With reference to FIG. 4, a display device 400 of the embodiment is, for example, a display, and a projection target PT may be human eye. The difference between this embodiment and the embodiment of FIG. 3 is that, an image beam combining element 480 is added. In this embodiment, the display device 400 includes a beam splitting element 410, a polarization modulating element 420, a light shifting element 430, a reflective liquid crystal panel 440, a light emitting element 450, a light polarizing element 460, at least one optical waveguide device 470 and the image beam combining element 480. Accordingly, in the display device 400 of the embodiment, after image beams IB1' and IB2' are incident to a second incident surface IS2 of the beam splitting element 410, the image beams IB1' and IB2' pass through a beam splitting surface SS of the beam splitting element 410 to be transmitted outside the beam splitting element 410 through a second exit surface ES2 in a second direction P2.

In this embodiment, the at least one optical waveguide device 470 is disposed on one side of the beam splitting element 410 along the second direction P2. The image beam combining element 480 is disposed on one side of the at least one optical waveguide device 470, and allows an environmental image beam to pass through. The at least one optical waveguide device 470 may be in form of a wedge, or other shapes. The at least one optical waveguide device 470 and the image beam combining element 480 may be formed into one single element or may be two elements. The projection target PT is disposed on transmission paths of the image beams IB1' and IB2', and disposed on one side of the at least one optical waveguide device 470. The at least one optical waveguide device 470 receives the shifted image beam IB1' and the non-shifted image beam IB2' emitted from the beam splitting element 410 through a third incident surface IS3'. In this embodiment, the image beams IB1' and IB2' are transmitted in the at least one optical waveguide device 470 (e.g., reflected one time). Further, the image beams IB1' and IB2' are incident to the image beam combining element 480. It is worth noting that, the image beam combining element 480 is, for example, a diffraction element, and an optical surface RS2' of the image beam combining element 480 is, for example, a reflective diffraction structure. In other embodiments, the optical surface RS2' may be a transmissive diffraction structure, but not limited thereto. In addition, the image beam combining element 480 would combine/merge the image beams IB1' and IB2', and an environmental image beam RIB from outside the display 400. The image beam combining element 480 reflects the image beams IB1' and IB2' by the optical surface RS2' and allows the environmental image beam RIB to pass through. In this way, the reflected image beams IB1' and IB2' and the environmental image beam RIB leave the at least one optical waveguide device 470 together through a third exit surface ES3' and are projected onto the projection target PT so an augmented reality effect may be provided. In this embodiment, the third incident surface IS3' and the third exit surface ES3' of the at least one optical waveguide device 470 are located on adjacent two sides of the at least one optical waveguide device 470, but not limited thereto.

In this way, the image beams IB1' and IB2' may sequentially generate two image frames on the projection target PT. Also, because the image beam IB1' is shifted by a distance, each pixel in the image frame generated by the image beam IB1' partially overlaps the respective pixel in the image frame generated by the image beam IB2'. In other words, because the image frame generated by the overlapping image beams IB1' and IB2' may provide higher image resolution than an original image frame provided by the reflective liquid crystal panel 440, an augmented reality display of the embodiment may effectively provide the image frame with high image resolution.

In summary, the display device of the invention may be applied in, for example, the common display, near-eye display, the virtual reality display and augmented reality display. Also, according to the display device of the invention, the shifted image beam and the non-shifted image beam may be generated by the beam splitting element, the polarization modulating element and the light shifting element such that each pixel in the image frame generated by shifted image beam overlaps with the respective pixel in the image frame generated by the non-shifted image beam. Accordingly, the overlapping image frames may provide higher image resolution than the original image frame provided by the LCOS panel. As a result, the display device of the invention may effectively improve image resolution of the reflective liquid crystal panel to provide favorable display effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A display device, comprising:
    a beam splitting element, configured to receive an illumination beam and allow an image beam to pass through, wherein the illumination beam is reflected in the beam splitting element and transmitted in a first direction;
    a polarization modulating element, disposed on one side of the beam splitting element along the first direction, and configured to modulate or maintain polarization states of the illumination beam and polarization states of the image beam;
    a light shifting element, disposed on one side of the polarization modulating element along the first direction, and configured to modulate the image beam having the polarization state to be shifted by a distance, wherein the polarization modulating element is disposed between the beam splitting element and the light shifting element; and
    a reflective liquid crystal panel, disposed on one side of the light shifting element along the first direction, and configured to receive the illumination beam and emit the image beam in a second direction, wherein the first direction is opposite to the second direction, wherein the light shifting element is disposed between the polarization modulating element and the reflective liquid crystal panel.

2. The display device according to claim 1, wherein when the image beam reflected by the reflective liquid crystal panel has a first polarization state, the polarization modulating element modulates the image beam having the first polarization state so as to emit the image beam having a second polarization state, and the image beam having the second polarization state is emitted outside the beam splitting element in the second direction after passing through the beam splitting element, wherein the first polarization state is perpendicular to the second polarization state, wherein when the image beam emitted from the reflective liquid crystal panel has the second polarization state, the image beam having the second polarization state is shifted by the distance in a direction perpendicular to the second direction after passing through the light shifting element, and the shifted image beam having the second polarization state is emitted outside the beam splitting element in the second direction after passing through the beam splitting element.

3. The display device according to claim 1, further comprising:
    a light emitting element, disposed on one side of the beam splitting element, and configured to provide the illumination beam; and
    a light polarizing element, disposed between the light emitting element and the beam splitting element, wherein after the illumination beam provided by the light emitting element passes through the light polarizing element, the beam splitting element receives the illumination beam having the first polarization state.

4. The display device according to claim 3, wherein the light emitting element is a laser light source or a light emitting diode light source.

5. The display device according to claim 1, wherein the polarization modulating element sequentially operates in between a first operation state and a second operation state,
wherein when the polarization modulating element is operated in the first operation state, the polarization modulating element does not modulate the illumination beam having the first polarization state so as to emit the illumination beam having the first polarization state,
wherein when the polarization modulating element is operated in the second operation state, the polarization modulating element modulates the illumination beam having the first polarization state, so as to emit the illumination beam having the second polarization state.

6. The display device according to claim 1, wherein the beam splitting element is a polarized beam splitter, and transmits the illumination beam having the first polarization state reflected in the beam splitting element in the first direction.

7. The display device according to claim 1, wherein the non-shifted image beam emitted from the beam splitting element and the shifted image beam are projected onto a projection target to respectively form a first image frame and a second image frame, and the first image frame partially overlaps with the second image frame.

8. The display device according to claim 7, further comprising:
at least one optical waveguide device, disposed on one side of the beam splitting element, and configured to receive the non-shifted image beam emitted from the beam splitting element and the shifted image beam through an incident surface, wherein the at least one optical waveguide device is disposed between the beam splitting element and the projection target on transmission paths of the image beams, wherein the non-shifted image beam and the shifted image beam are transmitted in the at least one optical waveguide device, and the non-shift image beam and the shifted image beam are separately projected onto the projection target through an exit surface of the at least one optical waveguide device.

9. The display device according to claim 7, further comprising:
at least one optical waveguide device, disposed on one side of the beam splitting element, and configured to receive the non-shifted image beam emitted from the beam splitting element and the shifted image beam through an incident surface; and
an image beam combining element, disposed on one side of the at least one optical waveguide device, and configured to receive the non-shifted image beam and the shifted image beam, wherein the image beam combining element combines the non-shifted image beam, the shifted image beam and an environmental image beam to be projected onto the projection target through an exit surface of the at least one optical waveguide device.

* * * * *